(12) United States Patent
Lubbers et al.

(10) Patent No.: US 7,590,800 B2
(45) Date of Patent: Sep. 15, 2009

(54) 2D DYNAMIC ADAPTIVE DATA CACHING

(75) Inventors: Clark E. Lubbers, Colorado Springs, CO (US); Michael D. Walker, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 291 days.

(21) Appl. No.: 11/480,088

(22) Filed: Jun. 30, 2006

(65) Prior Publication Data

US 2008/0005466 A1 Jan. 3, 2008

(51) Int. Cl.
*G06F 13/00* (2006.01)

(52) U.S. Cl. ...................................... 711/113
(58) Field of Classification Search .................. 711/113
See application file for complete search history.

(56) References Cited

U.S. PATENT DOCUMENTS

| | | | |
|---|---|---|---|
| 5,623,608 A | 4/1997 | Ng | |
| 5,761,718 A | 6/1998 | Lin et al. | |
| 5,812,996 A | 9/1998 | Rubin et al. | |
| 6,098,604 A | 8/2000 | Nemoto et al. | |
| 6,633,891 B1 | 10/2003 | Banford et al. | |
| 6,671,766 B1 | 12/2003 | Vandenberg et al. | |
| 6,738,865 B1 | 5/2004 | Burton et al. | |
| 6,813,693 B2 | 11/2004 | Chilimbi | |
| 6,868,439 B2 | 3/2005 | Basu et al. | |
| 6,910,106 B2 | 6/2005 | Sechrest et al. | |
| 6,934,802 B2 | 8/2005 | Cornaby et al. | |
| 6,978,325 B2 | 12/2005 | Gibble et al. | |
| 7,058,936 B2 | 6/2006 | Chilimbi et al. | |
| 2001/0018678 A1 | 8/2001 | Weiss et al. | |
| 2002/0078303 A1 | 6/2002 | Rozario et al. | |
| 2004/0024971 A1 | 2/2004 | Bogin et al. | |
| 2004/0205297 A1 | 10/2004 | Bearden | |
| 2005/0060498 A1 | 3/2005 | Curtis | |

*Primary Examiner*—Hyung S Sough
*Assistant Examiner*—Mardochee Chery
(74) *Attorney, Agent, or Firm*—Fellers, Snider, et al.

(57) ABSTRACT

Method and apparatus for caching readback data in a cache memory. Upon a transfer of cached readback data to a host device, a cache manager operates to force a retention of the readback data in the cache memory in relation to a time parameter and a locality parameter associated with said data. In this way, the readback data are either retained in hopes of satisfying a subsequent cache hit, or not retained to accommodate subsequently cached data. Preferably, the cache manager compares the time parameter to a time threshold and the locality parameter to a locality threshold, and forces said retention of the readback data if both said thresholds are met. The readback data is preferably associated with a data structure such as a RAID stripe, the time parameter preferably indicates elapsed time since last access to the structure and the locality parameter preferably indicates accesses to the structure.

20 Claims, 4 Drawing Sheets

REGION SIZE
REGION ACCESS COUNT
REGION THRESHOLDS
REGION HYSTERETICS

2D DYNAMIC ADAPTIVE DATA CACHING

FIELD OF THE INVENTION

The claimed invention relates generally to the field of data storage systems and more particularly, but not by way of limitation, to a method and apparatus for caching readback data from a storage array.

BACKGROUND

Storage devices are used to access data in a fast and efficient manner. Some types of storage devices use rotatable storage media, along with one or more data transducers that write data to and subsequently read data from tracks defined on the media surfaces.

Multi-device arrays (MDAs) can employ multiple storage devices to form a consolidated memory space. One commonly employed format for an MDA utilizes a RAID (redundant array of independent discs) configuration, wherein input data are stored across multiple storage devices in the array. Depending on the RAID level, various techniques including mirroring, striping and parity code generation can be employed to enhance the integrity of the stored data.

With continued demands for ever increased levels of storage capacity and performance, there remains an ongoing need for improvements in the manner in which storage devices in such arrays are operationally managed. It is to these and other improvements that preferred embodiments of the present invention are generally directed.

SUMMARY OF THE INVENTION

Preferred embodiments of the present invention are generally directed to an apparatus and method for caching readback data from a storage array.

In accordance with preferred embodiments, a cache memory stores the readback data upon retrieval from the storage array. Once the cached readback are transferred to a host device, a cache manager operates to determine whether to force a retention of the readback data in the cache memory. This determination is preferably made in relation to a time parameter and a locality parameter associated with said data.

In this way, the readback data are either retained in hopes of satisfying a subsequent cache hit, or not retained to accommodate subsequently cached data. Preferably, the cache manager compares the time parameter to a time threshold and the locality parameter to a locality threshold, and forces said retention of the readback data if both said thresholds are met.

The readback data is preferably associated with a data structure such as a RAID stripe, the time parameter preferably indicates elapsed time since last access to the structure and the locality parameter preferably indicates accesses to the structure.

In further preferred embodiments, the cache manager forms an array of regions, with each region corresponding to a selected subset of the storage array. Decisions to force retention of the readback data are thereafter preferably made in relation to a rate at which subsequent read requests from a host are satisfied from the cache memory.

Preferably, the cache manager adaptively adjusts at least one parameter in relation to the observed cache hit rate. When a RAID set failure is detected, at least one region of the array is preferably adjusted to correspond to a reconstruction boundary for the RAID set.

These and various other features and advantages which characterize the claimed invention will become apparent upon reading the following detailed description and upon reviewing the associated drawings.

DETAILED DESCRIPTION

Figure 1:
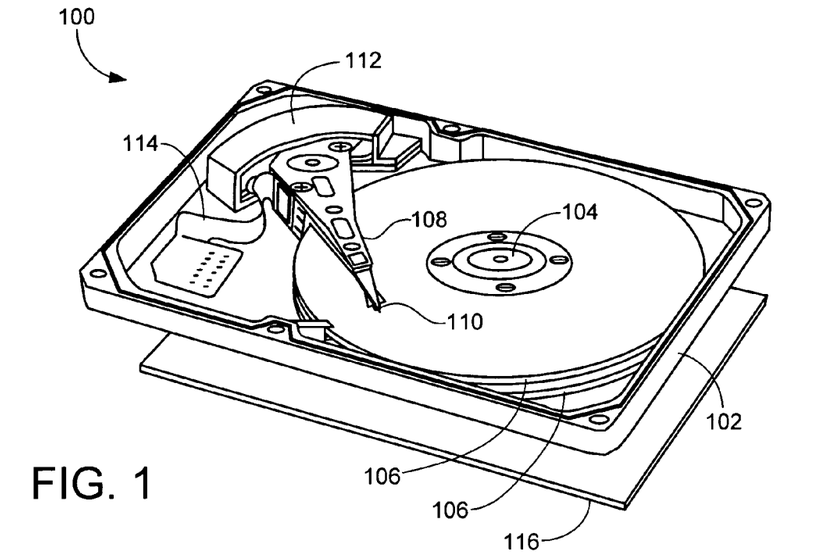
FIG. 1 generally illustrates a storage device constructed and operated in accordance with preferred embodiments of the present invention.

FIG. 1 shows an exemplary storage device 100 configured to store and retrieve user data. The device 100 is preferably characterized as a hard disc drive, although other device configurations can be readily employed as desired.

A base deck 102 mates with a top cover (not shown) to form an enclosed housing. A spindle motor 104 is mounted within the housing to controllably rotate media 106, preferably characterized as magnetic recording discs.

A controllably moveable actuator 108 moves an array of read/write transducers 110 adjacent tracks defined on the media surfaces through application of current to a voice coil motor (VCM) 112. A flex circuit assembly 114 provides electrical communication paths between the actuator 108 and device control electronics on an externally mounted printed circuit board (PCB) 116.

Figure 2:
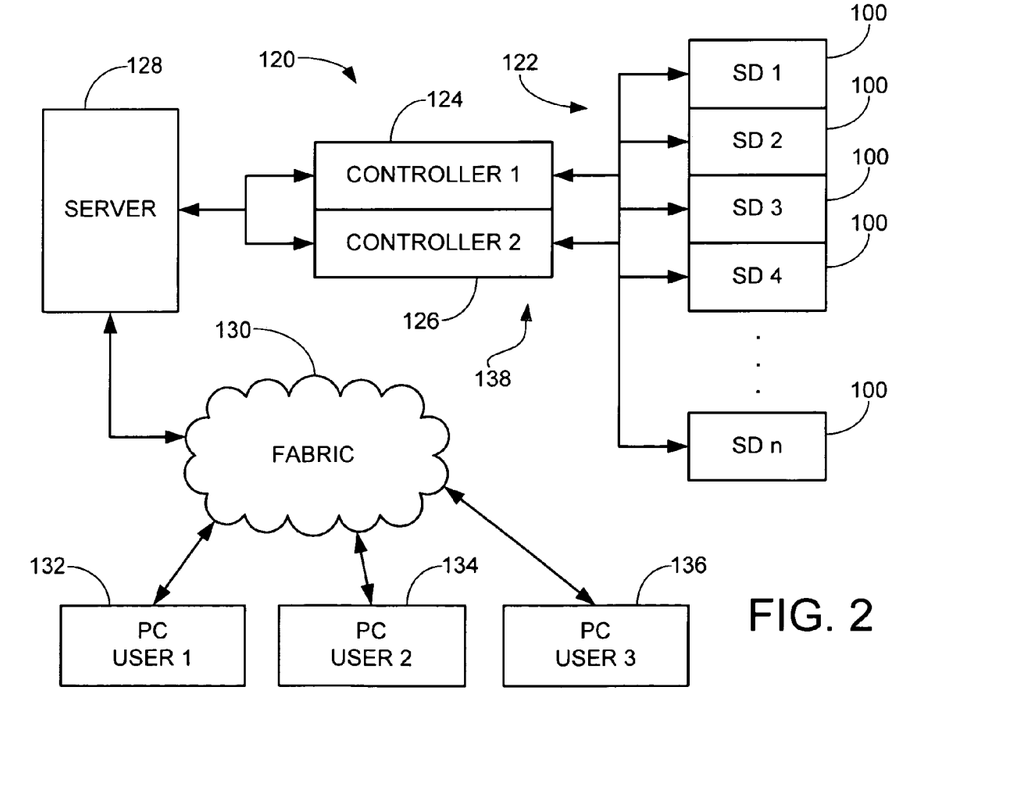
FIG. 2 is a functional block diagram of a network system which utilizes a number of storage devices such as illustrated in FIG. 1.

FIG. 2 generally illustrates an exemplary network system 120 that advantageously incorporates a number n of the storage devices (SD) 100 to form a consolidated storage array 122. Redundant controllers 124, 126 preferably operate to transfer data between the storage array 122 and a server 128. The server 128 in turn is connected to a fabric 130, such as a local area network (LAN), the Internet, etc.

Remote users respectively access the fabric 130 via personal computers (PCs) 132, 134, 136. In this way, a selected user can access the storage space 122 to write or retrieve data as desired.

The devices 100 and the controllers 124, 126 are preferably incorporated into a multi-device array (MDA) 138. The MDA 138 preferably uses one or more selected RAID (redundant array of independent discs) configurations to store data across the devices 100. Although only one MDA and three remote users are illustrated in FIG. 2, it will be appreciated that this is merely for purposes of illustration and is not limiting; as desired, the network system 120 can utilize any number and types of MDAs, servers, client and host devices, fabric configurations and protocols, etc.

Figure 3:
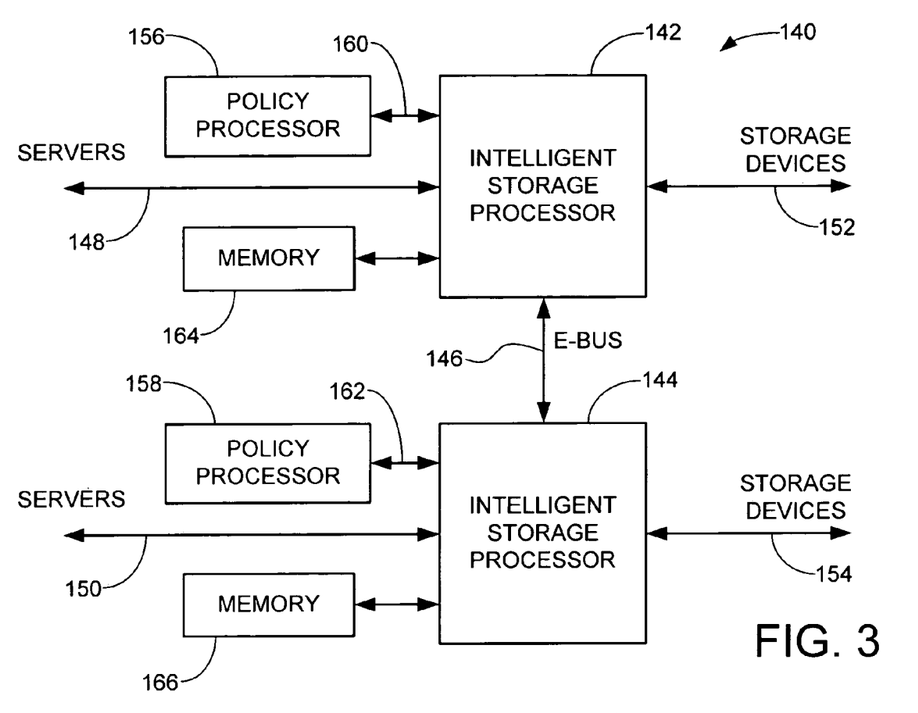
FIG. 3 provides a general representation of a preferred architecture of the controllers of FIG. 2.

FIG. 3 shows an array controller configuration 140 such as useful in the network of FIG. 2. Two intelligent storage processors (ISPs) 142, 144 are coupled by an intermediate bus 146 (referred to as an "E BUS"). Each of the ISPs 142, 144 is preferably disposed in a separate integrated circuit package on a common controller board. Preferably, the ISPs 142, 144 each respectively communicate with upstream application servers via fibre channel server links 148, 150, and with the storage devices 100 via fibre channel storage links 152, 154.

Policy processors 156, 158 execute a real-time operating system (RTOS) for the controller 140 and communicate with the respective ISPs 142, 144 via PCI busses 160, 162. The policy processors 156, 158 can further execute customized logic to perform sophisticated processing tasks in conjunction with the ISPs 142, 144 for a given storage application. The ISPs 142, 144 and the policy processors 156, 158 access memory modules 164, 166 as required during operation.

Figure 4:
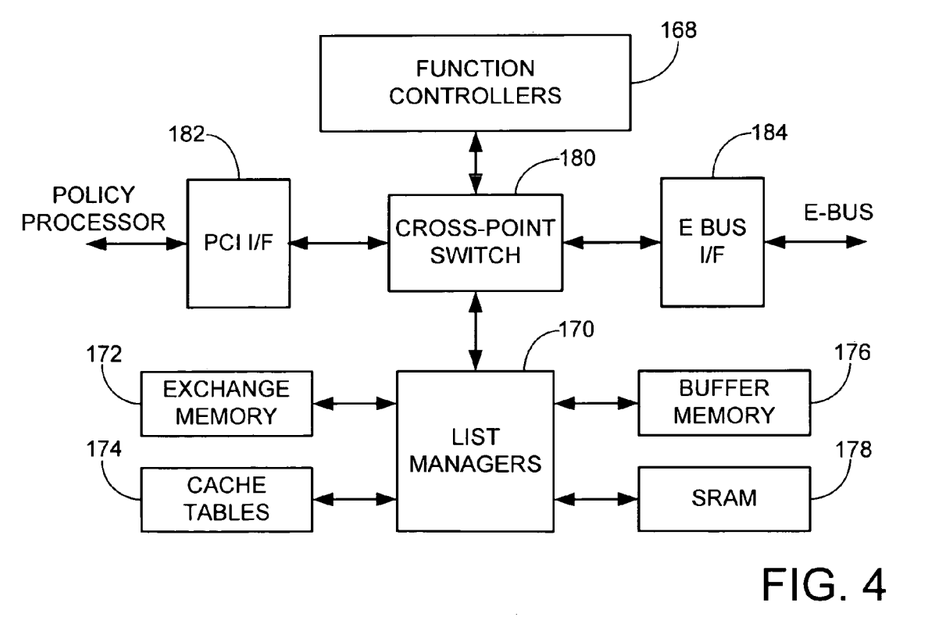
FIG. 4 provides a functional block diagram of a selected intelligent storage processor of FIG. 3.

FIG. 4 provides a preferred construction for a selected ISP of FIG. 3. A number of function controllers, collectively identified at 168, serve as function controller cores (FCCs) for a number of controller operations such as host exchange, direct memory access (DMA), exclusive-or (XOR), command routing, metadata control, and disc exchange. Each FCC preferably contains a highly flexible feature set and interface to facilitate memory exchanges and other scheduling tasks.

A number of list managers, denoted generally at 170 are used for various data and memory management tasks during controller operation, such as cache table management, metadata maintenance, and buffer management. The list managers 170 preferably perform well-defined albeit simple operations on memory to accomplish tasks as directed by the FCCs 168. Each list manager preferably operates as a message processor for memory access by the FCCs, and preferably executes operations defined by received messages in accordance with a defined protocol.

The list managers 170 respectively communicate with and control a number of memory modules including an exchange memory block 172, a cache tables block 174, buffer memory block 176 and SRAM 178. The function controllers 168 and the list managers 170 respectively communicate via a crosspoint switch (CPS) module 180. In this way, a selected function core of controllers 168 can establish a communication pathway through the CPS 180 to a corresponding list manager 170 to communicate a status, access a memory module, or invoke a desired ISP operation.

Similarly, a selected list manager 170 can communicate responses back to the function controllers 168 via the CPS 180. Although not shown, separate data bus connections are preferably established between respective elements of FIG. 4 to accommodate data transfers therebetween. As will be appreciated, other configurations can readily be utilized as desired.

A PCI interface (I/F) module 182 establishes and directs transactions between the policy processor 156 and the ISP 142. An E-BUS I/F module 184 facilitates communications over the E-BUS 146 between FCCs and list managers of the respective ISPs 142, 144. The policy processors 156, 158 can also initiate and receive communications with other parts of the system via the E-BUS 146 as desired.

The controller architecture of FIGS. 3 and 4 advantageously provides scalable, highly functional data management and control for the array. Preferably, stripe buffer lists (SBLs) and other metadata structures are aligned to stripe boundaries on the storage media and reference data buffers in cache that are dedicated to storing the data associated with a disk stripe during a storage transaction.

To further enhance processing efficiency, the controller architecture preferably employs a novel readback data caching methodology. Generally, readback data are retrieved from the storage devices 100 to cache memory pending transfer to a host device. As explained below, a 2D dynamic adaptive data caching technique is preferably employed to determine whether such readback data should be retained in the cache memory after such transfer, and if so, on what basis should such data be subsequently replaced by newer cached readback data. The term "2D" generally refers to an (at least) two dimensional analysis of factors of space (locality) and time.

Figure 5:
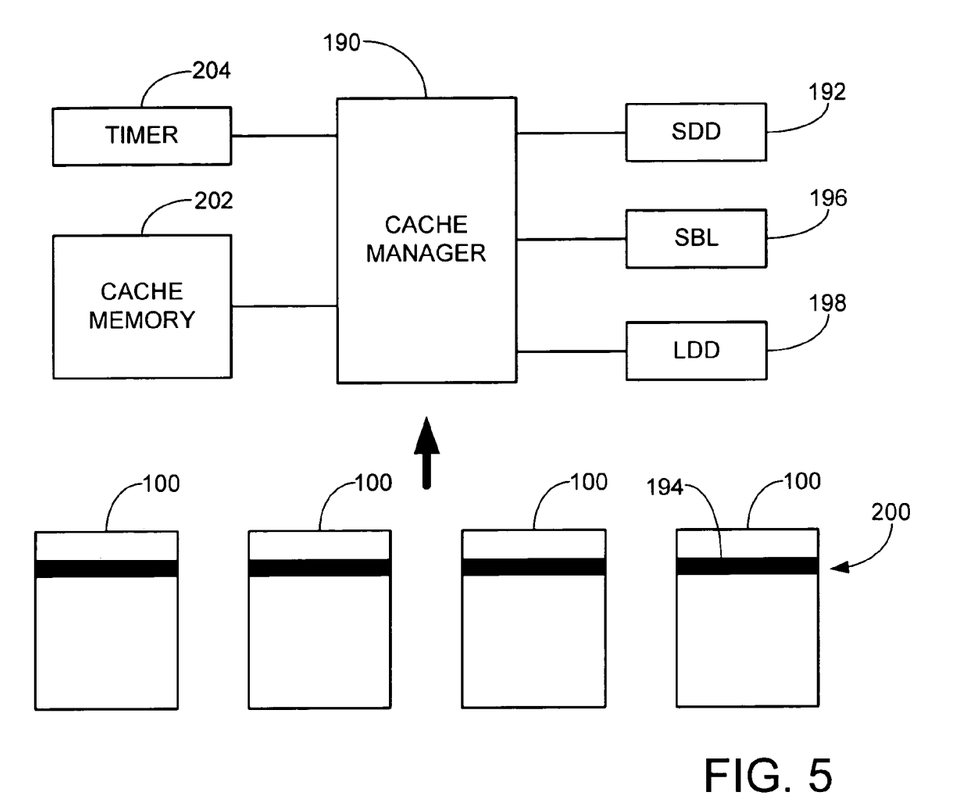
FIG. 5 generally illustrates a cache manager which operates to manage readback data retrieved from the storage array in accordance with preferred embodiments.

As shown in FIG. 5, the cached data are preferably managed on a node basis by a cache manager (CM) 190 using a data structure referred to as a stripe data descriptor (SDD) 192. Each SDD holds data concerning recent and current accesses to the data with which it is associated. Each SDD thus preferably corresponds to and aligns with a data structure as a subset of the overall storage array, such as a corresponding RAID stripe 194 (i.e., all of the data on a selected device 100 associated with a particular parity set). Each SDD 192 further preferably conforms to a particular SBL 196.

Each cache node managed by the CM 190 preferably references some particular SDD, with active SDD structures for a given set of logical discs (subset of the devices 100) being preferably linked in ascending order via a virtual block address (VBA) using a standard forward and backward linked list. The logical discs are preferably managed using an associated logical disc descriptor (LDD) 198.

Preferably, the VBA values are aligned with the RAID data organization using a grid system sometimes referred to as a RAID Allocation Grid System (RAGS). Generally, any particular collection of blocks belonging to the same RAID strip 200 (e.g., all of the data contributing to a particular parity set) will be assigned to a particular reliable storage unit (RSU) on a particular sheet.

A book consists of a number of sheets and is constructed from multiple contiguous sets of blocks from different devices 100. Based on the actual sheet and VBA, the books can be further sub-divided into zones, indicating the particular device or device set (when redundancy is employed).

Each SDD 192 preferably includes variables that indicate various states of the data, including access history, last offset, last block, timestamp data (time of day, TOD), and RAID level employed. As explained below, several region variables are also preferably employed within the SDD structure including variables relating to region SDD, region accessed, and region TOD.

The LDD 198 preferably includes variables used as discussed below including region size, hit ratio, reads, TOD threshold, access threshold, hysteretic direction (threshold and size), and region hysteretic (threshold and size). The hysteretic values track progressions in hit ratio rates; that is, rates of change in performance (better or worse) as various parameters are adjusted.

Preferably, during normal operations the cache manager 190 operates to direct the retrieval of data from the storage array to cache memory, such as represented by block 202 in FIG. 5. The data are normally retrieved in response to a read request from a host device (e.g., PCs 132, 134, 136 in FIG. 2) and so, upon retrieval, the data are temporarily stored in the cache memory 202 until such time that the data can be read out by an associated FCC or other processor to transfer the data to the host.

At this point, the CM 190 preferably makes a determination as to whether the transferred data should be retained in the cache memory 202 after such transfer. As will be recognized by those skilled in the art, it can be advantageous to retain cached readback data in hopes of satisfying subsequent read requests for the data by a host device, in which case the data can be transferred directly from cache without the need to schedule and execute a data readback operation with the storage devices 100.

Cache memory is generally a limited resource, however, so that filling the cache memory with readback data (either requested or speculative) that is not likely to be requested again by the host can detrimentally affect overall transfer rate performance since substantially all new requests will require disc assess operations.

Preferably, the CM 190 concurrently operates to manage the readback data at a number of different levels, depending on system requirements. A first level preferably involves forcing caching of blocks just read from the storage devices 100 associated with a given SDD 192 by comparing the accesses variable of the SDD 192 (also referred to herein as a "locality parameter") to the access threshold of the associated LDD 198 ("locality threshold"), and by comparing the TOD variable of the SDD ("time parameter") to the TOD threshold of the LDD ("time threshold").

The accesses variable of the SDD 192 preferably provides a relative measure of a rate at which accesses are made to the data associated with the SDD. For example, the accesses variable can be an incremental count that is updated upon each access (reads only, or reads and writes) to the data in the storage array defined by the SDD. The accesses variable thus provides an indication of "host interest" in the data in this locality; under normal circumstances, a higher existing number of accesses might produce a higher likelihood that more accesses will occur in the near future.

The TOD variable generally provides an indication of elapsed time since the most recent access. By subtracting the TOD variable from the current time, an aging assessment can be made on how frequently (or infrequently) the SDD is being accessed. The access and TOD thresholds of the LDD 198 are set to any suitable respective values.

So under this scenario, the CM 190 decides to retain the readback data in the cache (e.g., forced caching) if both the access threshold and the TOD threshold are met; that is, forced caching preferably takes place when the number of accesses reflected by the SDD 192 meets or exceeds the access threshold of the LDD 198, and the time since the last access associated with the SDD 192 is equal to or less than the TOD threshold of the LDD 198.

The TOD variables are preferably maintained at a suitable resolution such as $\frac{1}{100}$ sec (10 milliseconds, ms) from a free running counter 204. To ensure accuracy, time calculations should preferably take into account rollover of the counter 204. In a preferred embodiment, cached readback data that have not been accessed for a full time period, such as a full circuit of the counter (e.g., around 10 minutes or so) are automatically forced out of the cache.

It will be noted that removing data from cache preferably involves deallocation of the associated memory cells so that such cells are available to be immediately overwritten by newly cached data, and so may not necessarily involve an actual transfer of the removed data out of the cache.

In addition to the foregoing operation, addition thresholds can be set by the CM 190 when the number of accesses is above a second, higher threshold and the time since the last access is within a relatively small range. This can advantageously detect burst activity (highly localized repetitive reads in a very small time frame).

In a related embodiment, the CM 190 operates in an adaptive manner to continuously adjust the parameters to match ongoing operational loading. For example, in one embodiment the above thresholds are set to initial levels and the number of cache hits (read requests being satisfied from cache) is accumulated over a given period of time to see how well the thresholds meet the existing requirements. One or both of the thresholds can then be adjusted in an effort to increase the cache hit rate.

Figure 6:
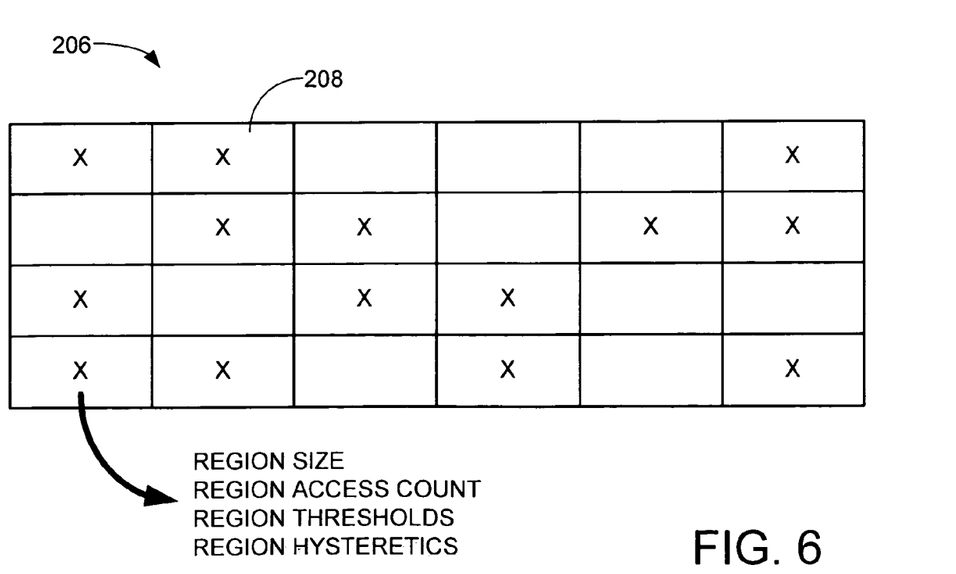
FIG. 6 shows a cache memory table utilized by the cache manager in accordance with preferred embodiments.

Alternatively, adaptive adjustments can be made based on the aforementioned regional variables. As generally depicted in FIG. 6, an array 206 of regions 208 within the storage array can be arbitrarily defined. Each region 208 is preferably a power of 2 in size and can correspond, for example, to multiple SDDs 192 with the first SDD in the region 208 being used to manage all of the data associated with that region. In this way, trends across adjacent SDDs can be detected and efficiently managed. This management technique can be applied to the entire storage array (or a contiguous portion thereof), or selected portions thereof such as indicated by the "X" marked regions 208 in FIG. 6.

Preferably, in this embodiment the CM 190 adaptively adjusts the LDD variables including the size and threshold variables based on the hysteretic variables and changes in the hit ratio. This process can be implemented when a baseline number of reads is detected. Instead of merely comparing the accesses and TOD variables in the SDD to the LDD thresholds, this alternative embodiment uses and maintains the region variables in the region SDD (first SDD) and utilizes these values for forced caching decisions.

The LDD parameters can be adaptively adjusted in a number of ways. In a preferred approach, the hit ratio will have an optimal value with a corresponding count in the hysteretic values. The count value preferably indicates the number of times that the optimal ("best") hit ratio has been achieved for a given period where the total number of reads exceeds a certain threshold. When less than optimum read hit levels are being experienced, the CM 190 preferably adjusts the thresholds one at a time in a particular direction, reversing direction when performance gets worse. Preferably, an increasing number of periods between changes are made as the number of direction changes increases.

The optimum values are tracked and the count value is preferably reset when a new optimal setting is discovered. It will be noted that changing the size of a region 208 will generally require passing over the entire SDD list to adjust the region SDD (first SDD) variables.

In further preferred embodiments, the various above caching approaches are further configured to take into account a failure condition experienced by the system. For example, in a RAID context where redundancies and parities are generated, it can generally be advantageous to increase caching levels of readback data when a RAID set is reduced (such as due to the loss of a device 100) and reconstruction of data is more probable. In such cases, the region size is preferably adjusted to align with the reconstruction boundaries.

The reconstruction boundaries are preferably set to correspond to individual RAID stripes of a larger RAID strip. Due to a number of factors, the column offset for the "missing" stripe (e.g., the stripe or stripes that need to be reconstructed due to the device failure event) may vary. Nevertheless, it is generally desirable to treat the reconstructed data from a missing stripe differently due to the processing required to reconstruct the missing data from the remaining RAID strip data.

The array provides an efficient way to see if a given set of data has been reconstructed (or still needs to be). If the data have not been reconstructed, then a lower threshold may be utilized for the missing data. The cache manager 190 thus preferably operates to first see if a given RAID strip lies within an unreconstructed region, and then to see if the particular SDD corresponds to missing data. If so, then a much lower threshold for retaining the data is preferably employed.

Figure 7:
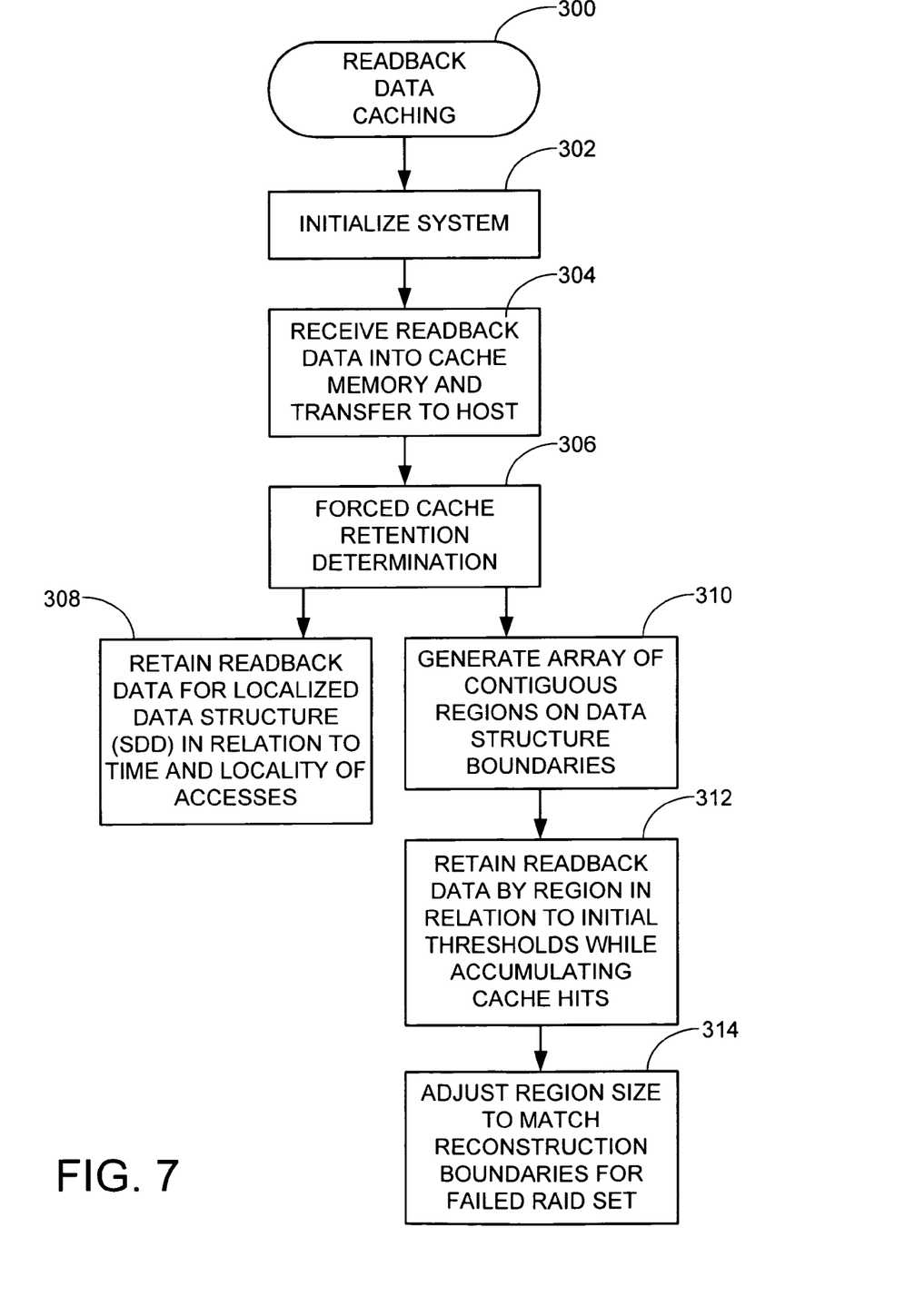
FIG. 7 is a flow chart for a READBACK DATA CACHING routine, generally illustrative of steps carried out in accordance with preferred embodiments of the present invention.

FIG. 7 sets forth a flow chart for a READBACK DATA CACHING routine 300, generally representative of steps preferably carried out in accordance with the foregoing discussion. At step 302, a system such as the network 120 of FIG. 2 is initialized and placed in a condition ready to carry out data transfer operations.

At step 304, read data requests are issued by various host devices (such as 132, 134, 136) and the data are retrieved from a storage array (such as devices 100), temporarily moved to cache memory (such as 202), and transferred to the requesting host.

A cache retention decision is then preferably made at step 306 by a cache manager such as 190 to determine whether the retrieved readback data will be retained in the cache memory in hopes of satisfying future host requests. The decision will generally depend on time and locality factors and can take a number of alternative approaches depending on operational loading and other system parameters.

At step 308, readback data associated with a given data structure is force cached in relation a comparison of a number of recent accesses and an elapsed time value. Preferably, an accesses variable of a SDD is compared to an access threshold of an LDD, and an aging value in relation to a time since the most recent access for the SDD is compared to a TOD threshold of the LDD. If both criteria are met, the data are retained in the cache memory 202. It is contemplated, although not required, that the operation of step 308 will occur at times when a relatively low localized read rate is experienced.

At step 310, an alternative adaptive approach is performed wherein an array 206 of regions 208 aligned to contiguous data structures is generated and data accesses are tracked on a per-region basis. This preferably is triggered when a relatively high localized read rate is experienced.

At step 312, initial thresholds are established and a count of cache hits is tracked. As before, time and locality parameters are employed in the caching decision. However, various parameters including region size and grouping as well as the respective time and number of accesses thresholds are individually adjusted to find optimal settings, and hysteretic values are kept to track performance gains.

Preferably, as shown by step 314, if a RAID reconstruction operation is detected, such as due to a failed device 100, the region boundaries of step 310 are further adjusted to correspond to reconstruction boundaries for the associated RAID set.

The above operations can be carried out sequentially or in tandem; for example, some locations of the storage devices 100 (e.g., certain books, etc.) may be subjected to relatively low levels of access activity in which case cache resources dedicated to those locations can be handled using step 308, whereas other higher activity locations (e.g., hot books) can be concurrently subjected to the flow of steps 310-314.

The foregoing embodiments provide several advantages over the art. Using both time and locality factors in making forced cache decisions generally provides a better assessment of overall trends in performance loading, and more efficiently allocates cache resources to the retention of data. The adaptive techniques set forth above further provide a mechanism to continuously fine tune various caching parameters to meet changing needs of the system, particularly in high activity regions. Moreover, the regional caching management such as illustrated by FIG. 6 allows for the ready detection of readback trends at cross-stripe levels, such the aforementioned book structure.

The term "forced" caching and the like will be construed consistent with the foregoing discussion as the operation to retain data in cache memory that would otherwise be immediately overwritten by new incoming data. The cache memory can be a single device or incorporated as a memory space across multiple devices.

Although not necessarily required, the forcing operation preferably comprises making the decision to allocate memory cells in the cache memory currently storing the readback data so as to prevent overwriting of said cells by other data. A subsequent release of such retained data from the cache preferably comprises deallocation of said cells to permit subsequent overwriting thereof by newly introduced cached data.

For purposes of the appended claims, the recited "first means" will be understood to correspond to at least the cache manager 190 which carries out readback data caching operations in accordance with FIG. 7.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising a cache manager configured to force a retention of readback data in a cache memory after a transfer of said data to a host device, wherein at the time of said transfer the cache manager compares a time parameter to a time threshold and compares a locality parameter to a locality threshold, forces said retention of the readback data if both said thresholds are met, and releases the readback data from the cache memory if at least one of said thresholds is not met.

2. The apparatus of claim 1, wherein the cache manager further monitors cache hit rate performance as a ratio of cache hits to read accesses, and selectively adjusts at least one of said thresholds when said ratio is less than a selected ratio.

3. The apparatus of claim 1, wherein the cache memory comprises an array of memory cells configured to initially store the readback data pending transfer to the host, wherein said forced retention by the cache manager comprises allocating said memory cells in the cache memory to continue storing the readback data so as to prevent overwriting of said cells by other data, else said memory cells are deallocated for overwriting with subsequently introduced cached data.

4. The apparatus of claim 1, wherein the time parameter is characterized as an elapsed time since a last access to a subset of a storage array to which the readback data corresponds, wherein the time threshold is a specified time interval, and wherein the time threshold is met if the elapsed time is less than the specified time interval.

5. The apparatus of claim 4, wherein the subset corresponds to a RAID stripe on a selected data storage device of the storage array.

6. The apparatus of claim 4, wherein the locality parameter is characterized as a number of accesses that have taken place to said subset over a selected period of time longer than said specified time interval, wherein the locality threshold is a plural number, and wherein the locality threshold is met if said number of accesses exceeds said plural number.

7. The apparatus of claim 1, wherein the cache manager further operates to divide a storage array into regions each region corresponding to a selected subset of the storage array, wherein the locality parameter is characterized as an accumulated plurality of accesses that have taken place over a specified time interval to a selected region of the storage array from which the data were retrieved, wherein the locality threshold is a plural number, and wherein the locality threshold is met if said plurality of accesses exceeds said plural number.

8. The apparatus of claim 7, wherein the cache manager further monitors cache hit rate performance as a ratio of cache hits to read accesses, and selectively adjusts the size of the selected region when said ratio is less than a selected ratio so that subsequent determinations of forced retention of readback data are made by the cache manager based on an accumulated number of read accesses to the adjusted size of the selected region.

9. The apparatus of claim 8, wherein the time threshold is characterized as a first time threshold and the locality threshold is characterized as a first locality threshold, wherein the cache manager additionally specifies a different, second time threshold and a different, second locality threshold used to force retention of said readback data when said readback data are associated with a data reconstruction operation resulting from a device failure in a RAID environment.

10. The apparatus of claim 1, wherein upon forced retention of the data in the cache memory, the data are subsequently released from said cache memory when the data are not accessed by the host for an elapsed period of time that exceeds a maximum elapsed time threshold.

11. An apparatus comprising a cache memory configured to receive readback data from a storage array and first means for forcing retention of the readback data in the cache memory after a transfer of said data to a host device in relation to a time parameter and a locality parameter by comparing the time parameter to a time threshold and comparing the locality parameter to a locality threshold, forcing said retention of the readback data if both said thresholds are met, and releasing the readback data from the cache memory if at least one of said thresholds is not met.

12. The apparatus of claim 11, wherein the first means comprises a cache manager which further operates to monitor cache hit rate performance as a ratio of cache hits to read accesses, and to selectively adjust at least one of said thresholds when said ratio is less than a selected ratio.

13. A method comprising steps of temporarily storing in a cache memory readback data from a storage array, and forcing retention of the readback data in the cache memory responsive to a transfer of said data to a host device in relation to a time parameter and a locality parameter associated with said readback data, wherein the time parameter comprises an elapsed time since a last access to a subset of the storage array from which the readback data are retrieved, and wherein the locality parameter is characterized as an accumulated plurality of accesses that have taken place to said subset over a selected period of time longer than said elapsed time.

14. The method of claim 13, wherein the forcing retention step comprises comparing the time parameter to a time threshold and the locality parameter to a locality threshold, and forcing said retention of the readback data in the cache memory upon said transfer if both said thresholds are met, wherein the cache memory does not retain the readback data in the cache memory if at least one of said thresholds is not met.

15. The method of claim 13, wherein the cache memory of the temporarily storing step comprises an array of memory cells configured to initially store the readback data pending transfer to the host, and wherein the forcing retention step comprises allocating said memory cells in the cache memory to continue storing the readback data so as to prevent overwriting of said cells by other data, else deallocating said cells for overwriting with subsequently introduced cached data.

16. The method of claim 13, wherein the forcing step comprises comparing the elapsed time to a time threshold comprising a specified time interval, and retaining the readback data when the elapsed time is less than the time threshold.

17. The method of claim 13, wherein the forcing step comprises comparing the accumulated plurality of accesses to a locality threshold comprising a plural number, and retaining the readback data when the accumulated plurality of accesses exceeds the locality threshold.

18. The method of claim 13, further comprising a prior step of generating an array of regions each region corresponding to a selected subset of the storage array, wherein the forced retention of said readback data is performed in relation to a rate at which subsequent read requests from a host are satisfied from the cache memory.

19. The method of claim 18, wherein the subset corresponds to a first portion of the storage array having a first overall data capacity, wherein the method further comprises monitoring cache hit rate performance as a ratio of cache hits to read accesses for data within said first portion, comparing said ratio to a selected ratio, and adjusting the subset to correspond to a different, second portion of the storage array having a second overall data capacity different from the first overall data capacity when the ratio is less than the selected ratio.

20. The method of claim 13, wherein said accumulated plurality of accesses that have taken place to said subset comprise accesses to different data at addresses adjacent to said readback data in the subset.

* * * * *

UNITED STATES PATENT AND TRADEMARK OFFICE
CERTIFICATE OF CORRECTION

PATENT NO. : 7,590,800 B2
APPLICATION NO. : 11/480088
DATED : September 15, 2009
INVENTOR(S) : Lubbers et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 368 days.

Signed and Sealed this

Twenty-first Day of September, 2010

David J. Kappos
*Director of the United States Patent and Trademark Office*